(12) United States Patent
Chao

(10) Patent No.: US 6,961,236 B1
(45) Date of Patent: Nov. 1, 2005

(54) COMPUTER CHASSIS

(75) Inventor: Mei-Lien Chao, Chung-Ho (TW)

(73) Assignee: Cooler Master Co., Ltd., Taipei Hsien (TW)

( * ) Notice: Subject to any disclaimer, the term of this patent is extended or adjusted under 35 U.S.C. 154(b) by 0 days.

(21) Appl. No.: 10/862,367

(22) Filed: Jun. 8, 2004

(51) Int. Cl.$^7$ ................................. G06F 1/16
(52) U.S. Cl. ..................... 361/683; 312/293.2; 307/64
(58) Field of Search ................ 361/809–810, 361/825, 836, 679–687, 724–727; 312/223.1, 312/223.2, 293.2, 257.1; 165/80.3, 121–122; 307/64

(56) References Cited

U.S. PATENT DOCUMENTS

| | | | |
|---|---|---|---|
| 6,031,725 A * | 2/2000 | Scholder et al. ............ 361/759 |
| 6,247,767 B1 * | 6/2001 | Liu et al. ................. 312/223.2 |
| 6,836,407 B2 * | 12/2004 | Faneuf et al. ............... 361/687 |
| 2004/0120106 A1 * | 6/2004 | Searby et al. ............... 361/683 |
| 2004/0136151 A1 * | 7/2004 | Lin et al. .................... 361/683 |

* cited by examiner

Primary Examiner—Hung Van Duong
(74) Attorney, Agent, or Firm—Rosenberg, Klein & Lee

(57) ABSTRACT

A computer chassis has a post assembly, a motherboard holder, a guardian board and a mounting board. The post assembly has a first post, a second post and a power supply holder. The motherboard holder is detachably mounted to one of the first post and the second post. The guardian board is detachably mounted between the first post and the second post. The mounting board is detachably mounted between the first post and the second post. The arrangement of the motherboard holder, the guardian board and the mounting board may be changed to make the computer chassis compatible with an ATX motherboard or a BTX motherboard.

10 Claims, 7 Drawing Sheets

COMPUTER CHASSIS

BACKGROUND OF THE INVENTION

1. Field of the Invention

The present invention relates to a computer chassis, and more particularly to a computer chassis compatible with an ATX motherboard and a BTX motherboard.

2. Description of Related Art

A computer usually has a computer chassis that may hold a motherboard, a power supply and multiple printed circuit boards (PCB) such as a graphic card, a sound card and a network card.

The motherboard mounted to the computer chassis usually has electronic components such as electric capacities, slots for Random Access Memories (RAM), a socket for a central processing unit (CPU) mounted on the motherboard. Motherboards are available in several standards such as an advanced technology extended (ATX) standard and a micro-ATX standard depending on arrangements of electronic components on the motherboards. ATX motherboards are applied to most computers nowadays.

With reference to FIG. 7, a conventional computer chassis in accordance with the prior art is compatible with ATX motherboards and comprises two posts (70), a motherboard holder (80) and a back panel (90). The motherboard holder (80) is mounted on one of the posts (70). The back panel (90) is formed integrally between the posts (70) and has a top edge (not numbered), a bottom edge (not numbered), two sides (not numbered), a rectangular hole (91), two vents (92) and multiple longitudinal slots (93). The rectangular hole (91) is defined through the back panel (90) close to the top edge of the back panel (90) and is adjacent to the motherboard holder (80). The vents (92) are defined through the back panel (90) close to the top edge of the back panel (90) and are adjacent to the rectangular hole (91). The longitudinal slots (93) are defined through the back panel (90) close to the bottom edge of the back panel (90) under the rectangular slots (91) and the vents (92). The arrangement of the rectangular hole (91), vents (92) and the longitudinal slots (93) of the back panel (90) is aimed at an ATX motherboard.

The famous chip-manufacturer, Intel Corp.®, redesigns the arrangement of electronic components on a motherboard to be adapted to new computer hardware and to improve the performance of the motherboard, as well as setting a balanced technology extended (BTX) standard for motherboards. The arrangement of electronic components on a BTX motherboard is opposite to the arrangement of electronic components on an ATX motherboard. The back panel (90) of the conventional computer chassis is formed integrally and is incompatible with the BTX motherboards, and the arrangement of the rectangular hole (91), vents (92) and the longitudinal slots (93) on the back panel (90) is not available for the BTX motherboard. Therefore, computer chassis manufacturers manufacturing the conventional computer chassis have to manufacture BTX computer chassis additionally for BTX motherboards. However, computer hardware develops very rapidly and BTX motherboards are becoming very popular and even substitute for ATX motherboards. It is predictable that ATX motherboards will be unmarketable soon and the computer chassis manufacturers will incur significant losses due to the obsolete conventional computer chassis, especially to ATX motherboards.

To overcome the shortcomings, the present invention provides an improved computer chassis to mitigate or obviate the aforementioned problems.

SUMMARY OF THE INVENTION

The main objective of the invention is to provide a computer chassis compatible with ATX and BTX motherboards.

The computer chassis in accordance with the present invention comprises a post assembly, a motherboard holder, a guardian board and a mounting board.

The post assembly has a first post, a second post and a power supply holder. The motherboard is detachably mounted to one of the first post and the second post. The guardian board is detachably mounted between the first post and the second post. The mounting board is detachably mounted between the first post and the second post. The motherboard holder, the guardian board and the mounting board are in two arrangements respectively for ATX and BTX motherboards.

Other objects, advantages and novel features of the invention will become more apparent from the following detailed description when taken in conjunction with the accompanying drawings.

DETAILED DESCRIPTION OF PREFERRED EMBODIMENT

A computer chassis in accordance with the present invention may hold a power supply (not shown), a motherboard (not shown) with input and output ports (not shown) such as universal serial bus (USB) ports and multiple PCBs (not shown).

Figure 2:
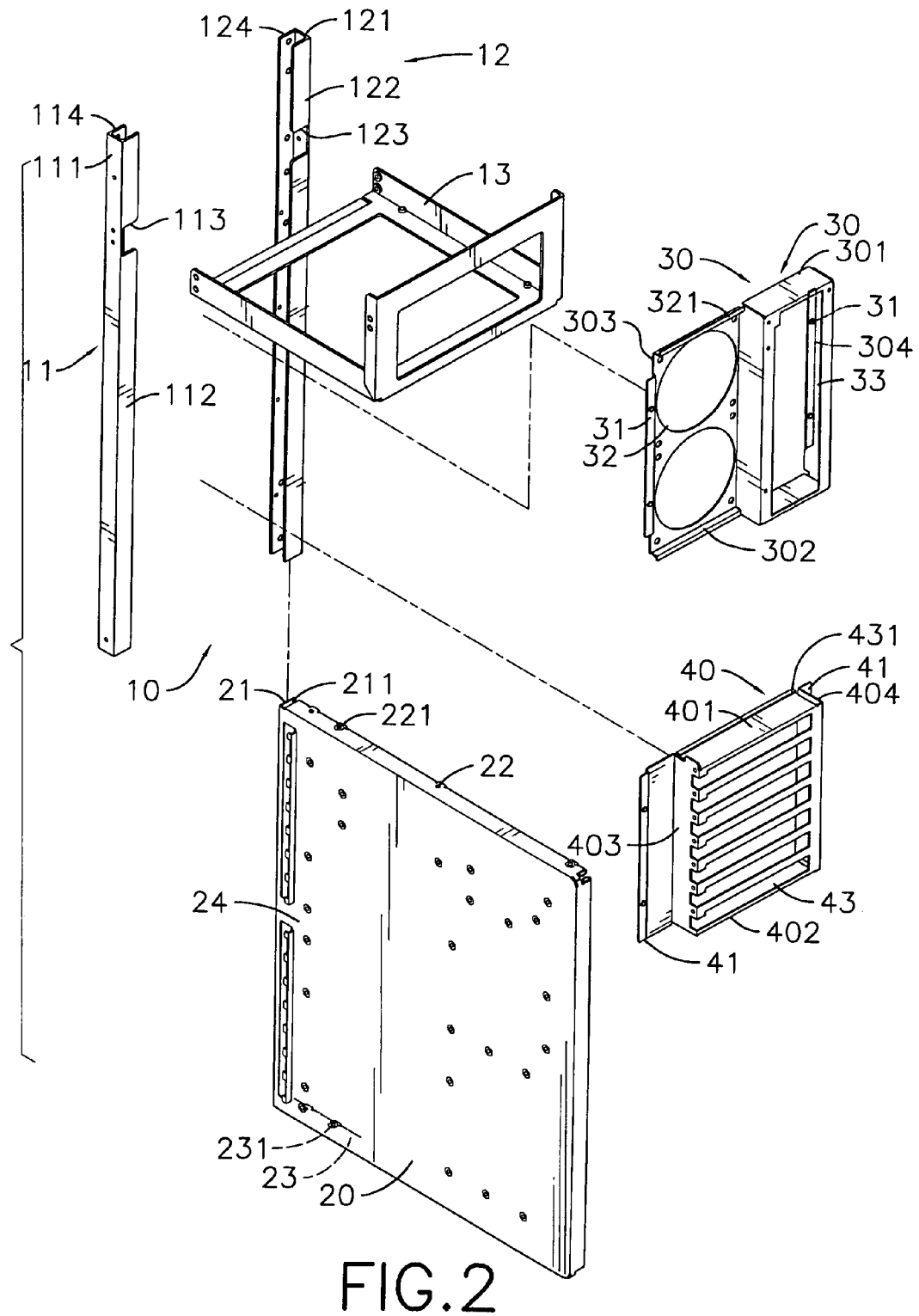
FIG. 2 is an exploded perspective view of the computer chassis in FIG. 1.
Figure 5:
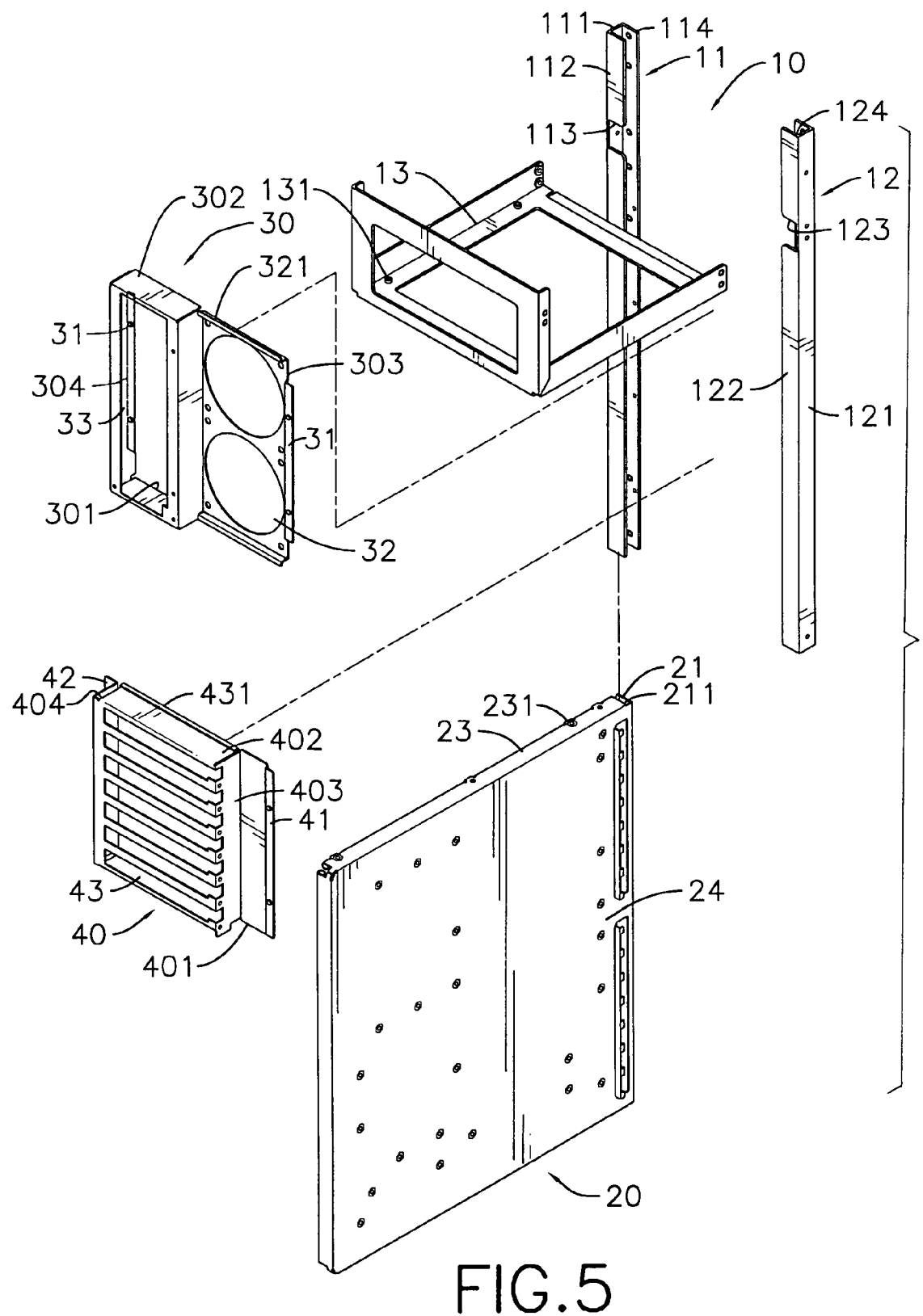
FIG. 5 is an exploded perspective view of the computer chassis in FIG. 4.

With reference to FIGS. 2 and 5, the computer chassis in accordance with the present invention comprises a post assembly (10), a motherboard holder (20), a guardian board (30) and a mounting board (40).

The post assembly (10) has a first post (11), a second post (12), and a power supply holder (13). The first post (11) has a top end, a bottom end, a first spine (111), a front side wall (112) and a back side wall (114). The first spine (111) has two sides. The front side wall (112) extends from one of the sides of the first spine (111) and has a first mounting notch (113) defined close to the top end of the first post (11). The back side wall (114) extends from the other side of the first spine (111).

The second post (12) is opposite to the first post (11) and has a top end, a bottom end, a second spine (121), a front side wall (122) and a back side wall (124). The second spine (121) has two sides. The front side wall (122) extends from one of the sides of the second spine (121), corresponds to the front side wall (112) on the first post (11) and has a second mounting notch (123) defined close to the top end of the second post (12) and aligned with the first mounting notch (113). The back side wall (124) extends from the other side of the second spine (124) and corresponds to the rear side wall (114) on the first post (11).

The power supply holder (13) is adapted to hold the power supply, is mounted between the first post (11) and the second post (12), is engaged with the first mounting notch (113) and the second mounting notch (123) and has a bottom and two bottom sides. Each bottom side of the power supply holder (13) has two side mounting bores (131).

The motherboard holder (20), detachably mounted to one of the first post (11) and the second post (12), is adjacent to the one of the bottom sides of the power supply holder (13) and has a top edge (22), a bottom edge (23), a proximal side (24), and a distal side, a mounting member and a vertical slot (211). The top edge (22) has two top mounting bores (221) corresponding to the side mounting bores (131) of the bottom side of the power supply holder (13) close to the second post (12). The bottom edge (23) has two bottom mounting bores (231) corresponding to the side mounting bores (131) of the bottom side of the power supply holder (13) close to the first post (11). One of the top edge (22) and the bottom edge (23) of the motherboard holder is mounted to the bottom side of the power supply holder (13). The proximal side (24) is connected to one of the first post (11) and the second post (12). The mounting member is defined on the proximal side (24) and is mounted to one of the first post (11) and the second post (12). The mounting member is a bent tab (21), extends from the proximal side (24) of the motherboard holder (20) and is mounted between the front side wall (112,122) and the back side wall (114,124) of one of the first post (11) and the second post (12). The vertical slot (211) is defined between the bent tab (21) and the proximal side (24) of the motherboard holder (20) and corresponds selectively to the front side walls (112, 122) of the first post (11) and the second post (12).

The guardian board (30) is detachably mounted between the first post (11) and the second post (12), is connected to the bottom of the power supply holder (113) and has a top edge (301), a bottom edge (302), a first side (303), a second side (304), a rectangular hole (33), two vents (32), two side tabs (31) and two stops (321). The rectangular hole (33) is adapted to hold the input and output ports of the motherboard, and is defined through the guardian board (30) close to the second side (304). The vents (32) are defined through the guardian board (30) close to the first side (303). The side tabs (31) are defined respectively on the first side (303) and the second side (304) of the guardian board (30) and are mounted respectively to the back side wall (114) of the first post (11) and the back side wall (124) of the second post (112). The stops (321) are defined respectively on the top edge (301) and the bottom edge (302) of the guardian board (30).

The mounting board (40) is detachably mounted between the first post (11) and the second post (12) and has a top edge (401), a bottom edge (402), a first side (403), a second side (404), multiple longitudinal slots (43), multiple mounting bores (44), two side tab (41) and two flanges (431). The multiple longitudinal slots (43) are defined through the mounting board (40), are arranged abreast and are perpendicular to the first post (11) and the second post (12). The multiple mounting bores (44) are defined in the first side (403) of the mounting board (40), correspond to and are adjacent respectively to the multiple longitudinal slots (43).

The side tabs (42) are defined respectively on the first side (403) and the second side (404) of the mounting board (40). The flanges (431) correspond to the stops (321) and are defined respectively on the top edge (401) and the bottom edge (402) of the mounting board (40).

The motherboard holder (20), the guardian board (30) and the mounting board (40) mounted on the post assembly (10) are available in two arrangements to make the computer chassis in accordance with the present invention be adapted to an ATX motherboard (not shown) or a BTX motherboard (not shown).

Figure 1:
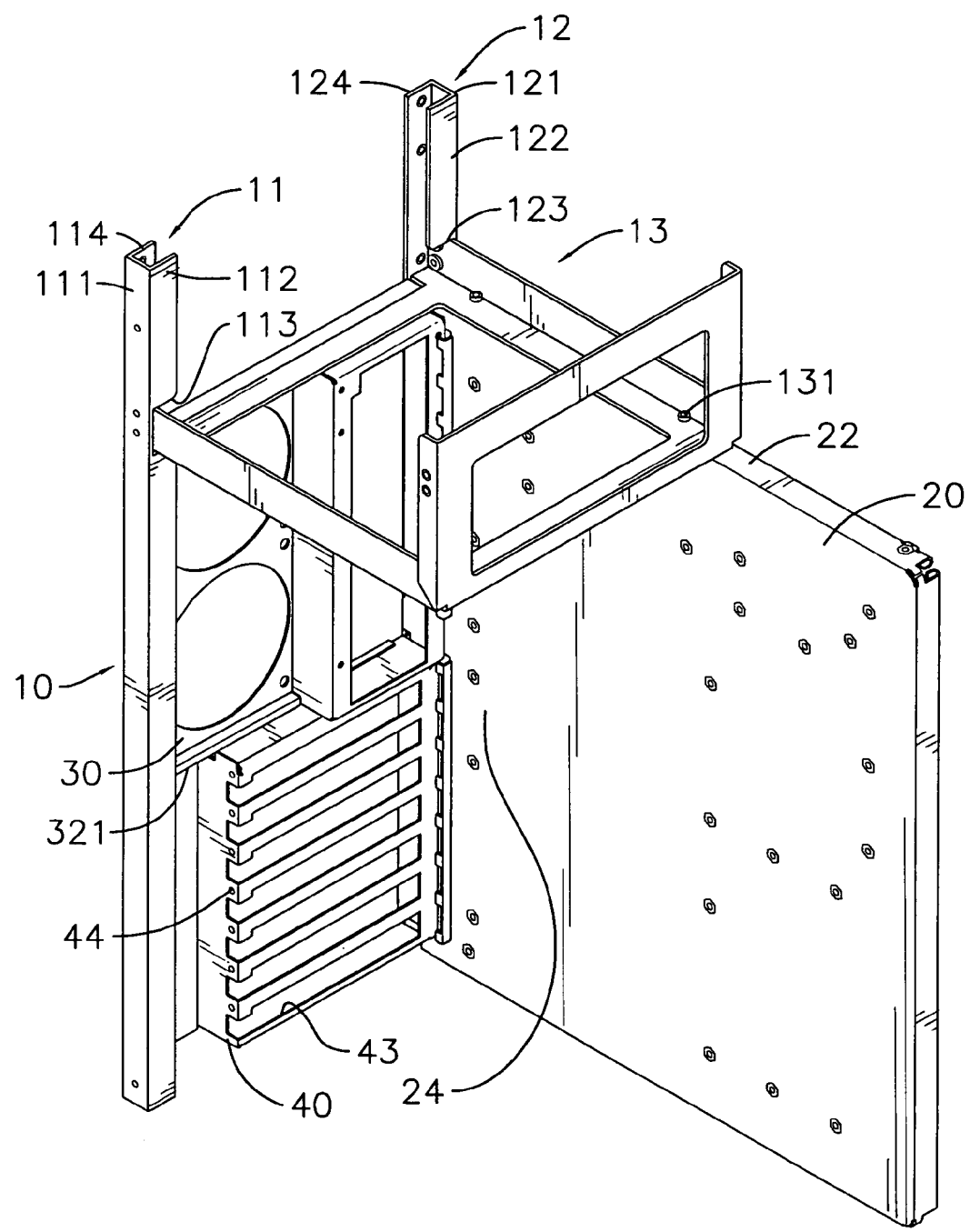
FIG. 1 is a perspective view of a computer chassis in accordance with the present invention and compatible with an ATX motherboard.
Figure 3:
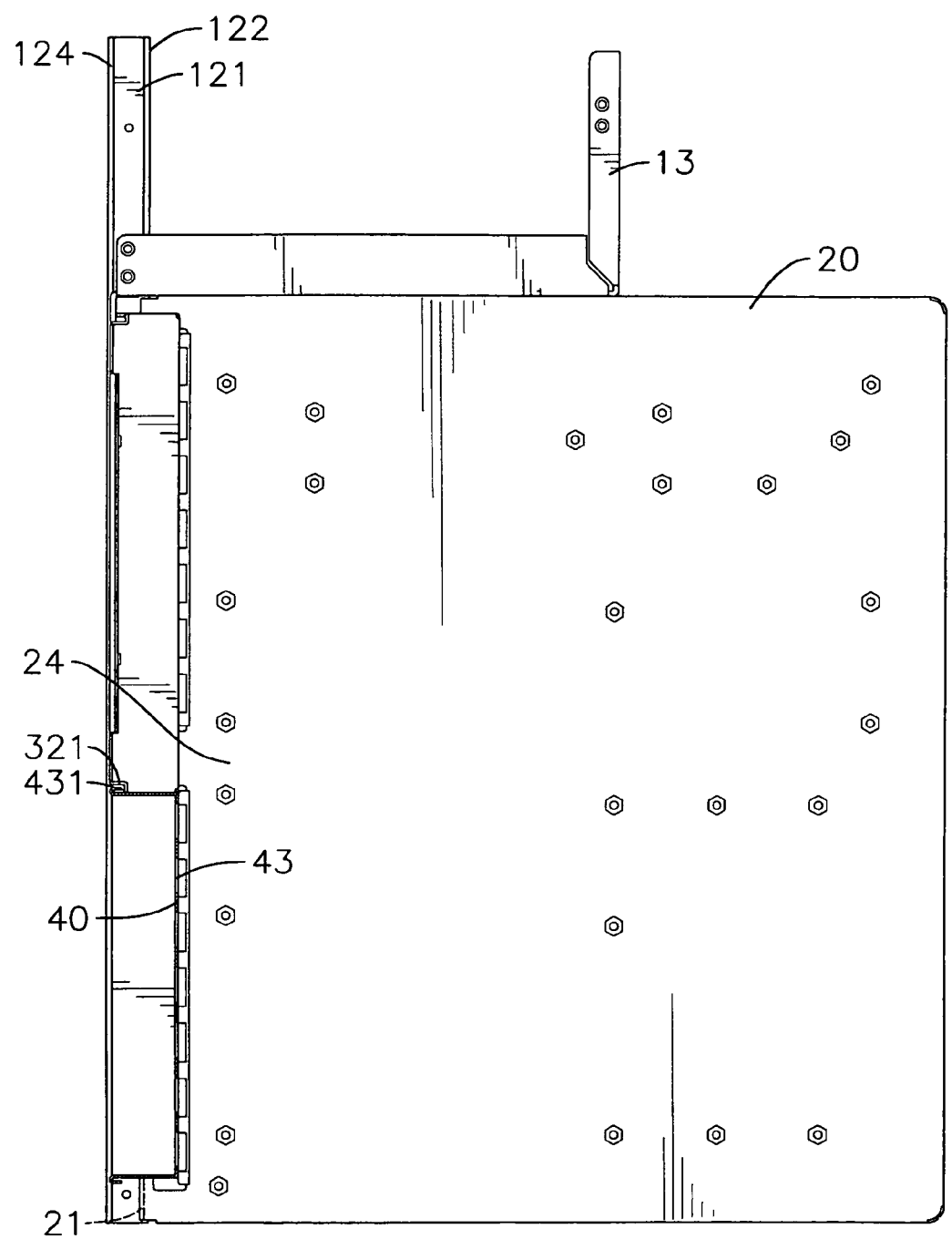
FIG. 3 is a side plan view of the computer chassis in FIG. 1.

1. When the computer chassis in accordance with the present invention is adapted to the ATX motherboard:

With reference to FIGS. 1, 2 and 3, the motherboard holder (20) is mounted to the second post (12). The bent tab (21) of the motherboard holder (20) is mounted between the front side wall (122) and the back side wall (124) of the second post (12). The front side wall (122) of the second post (12) is engaged into the slot (211) of the motherboard (20). The guardian board (30) is mounted between the first post (11) and the second post (12). The side tab (31) of first side (303) is attached to the back side wall (114) of the first post (11) and the side tab (31) of second side (304) is attached to the back side wall (124) of the first post (12). The stop (321) of the top edge (301) of the guardian board (30) is adjacent to the bottom of the power supply holder (13).

The mounting board (40) is mounted between the first post (11) and the second post (12) with the side tab (41) of first side (403) mounted to the back side wall (114) of the first post (11) and the side tab (41) of second side (404) mounted to the back side wall (124) of the first post (12). The flange (431) of the top edge (401) of the mounting board (40) is engaged with the stop (321) of the bottom edge (302) of the guardian board (30).

Figure 4:
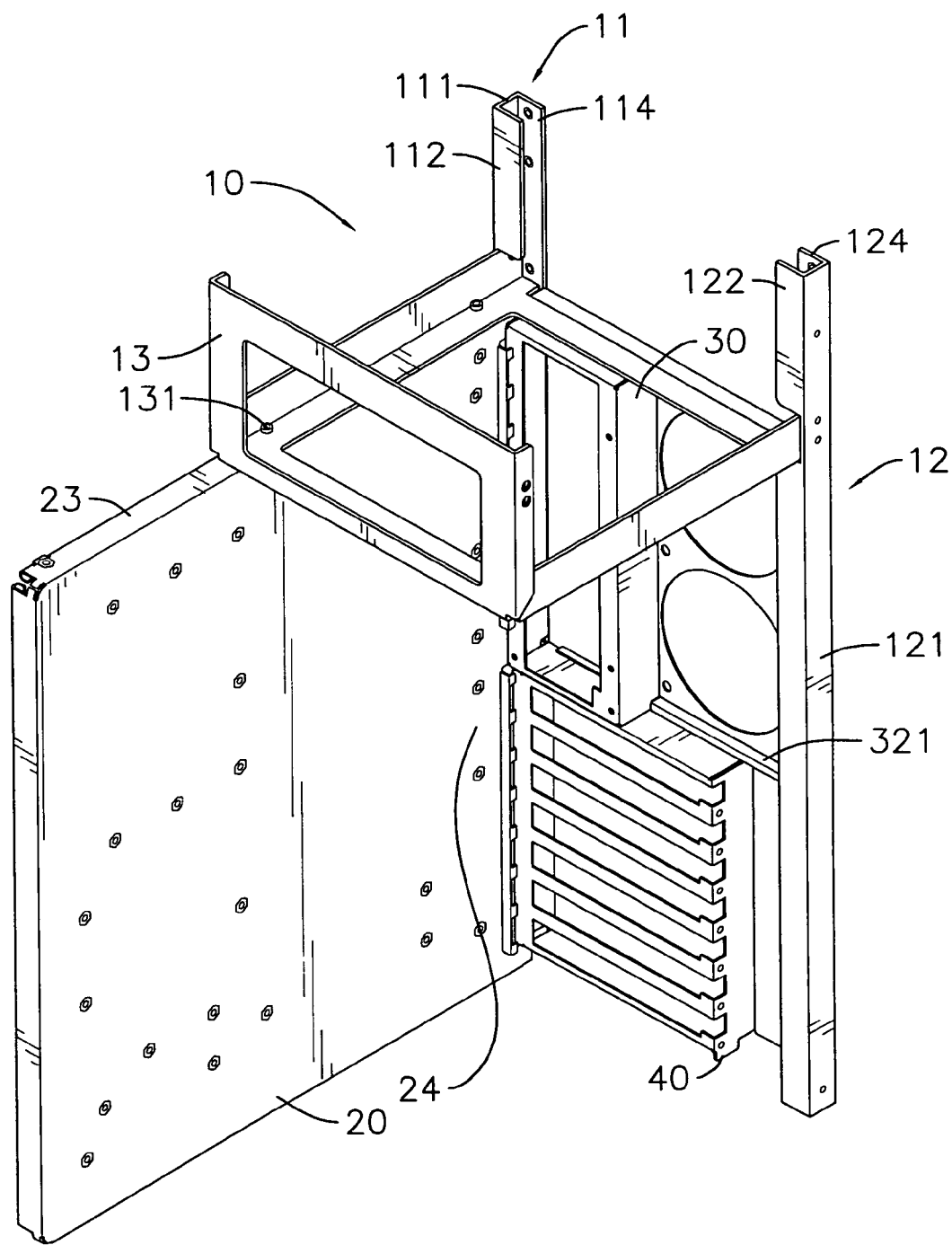
FIG. 4 is a perspective view of the computer chassis in FIG. 1 showing that the motherboard holder, the guardian board and the mounting board are arranged to be compatible with a BTX motherboard.
Figure 6:
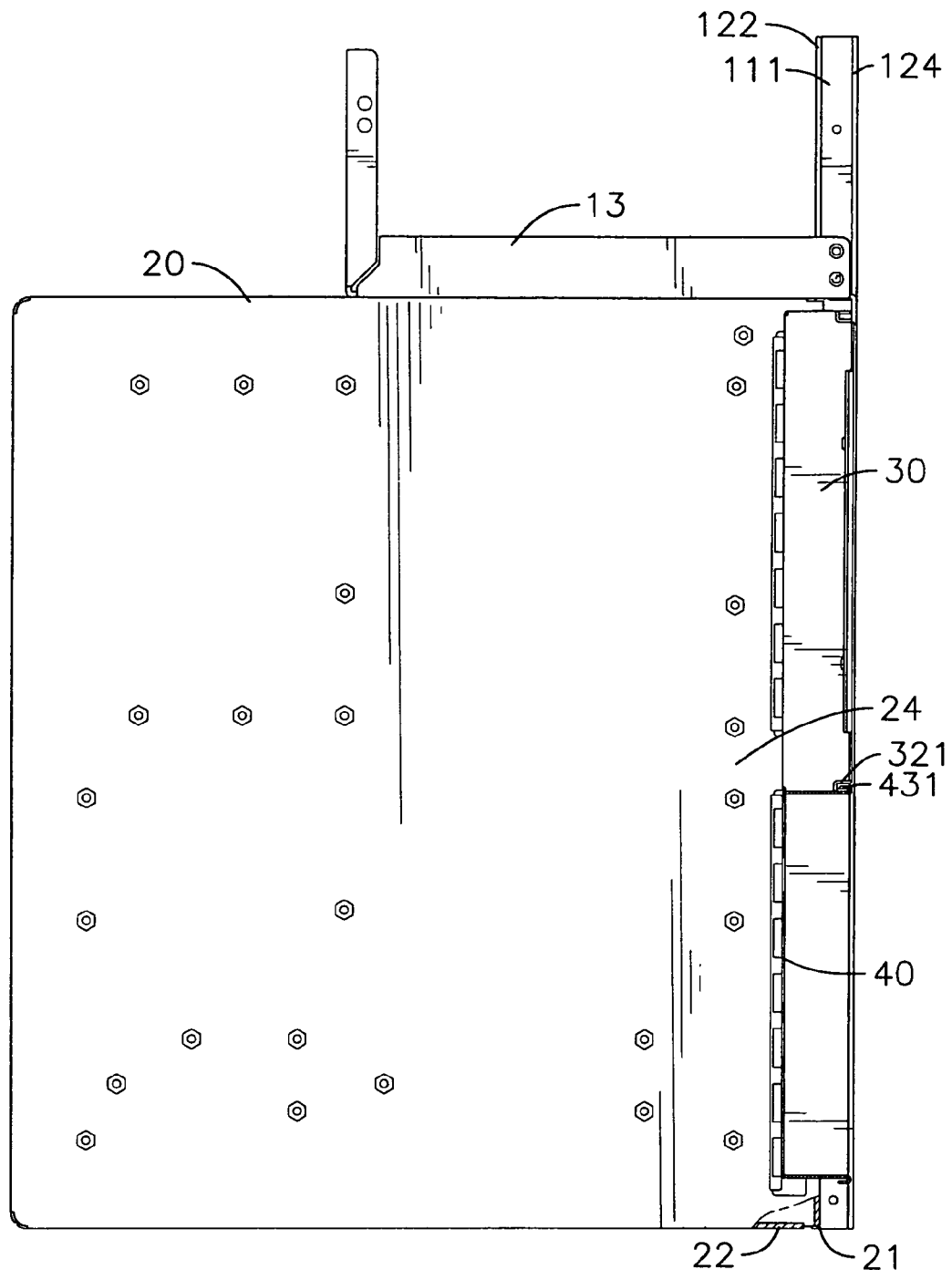
FIG. 6 is a side plan view of the computer chassis in FIG. 4.
Figure 7:
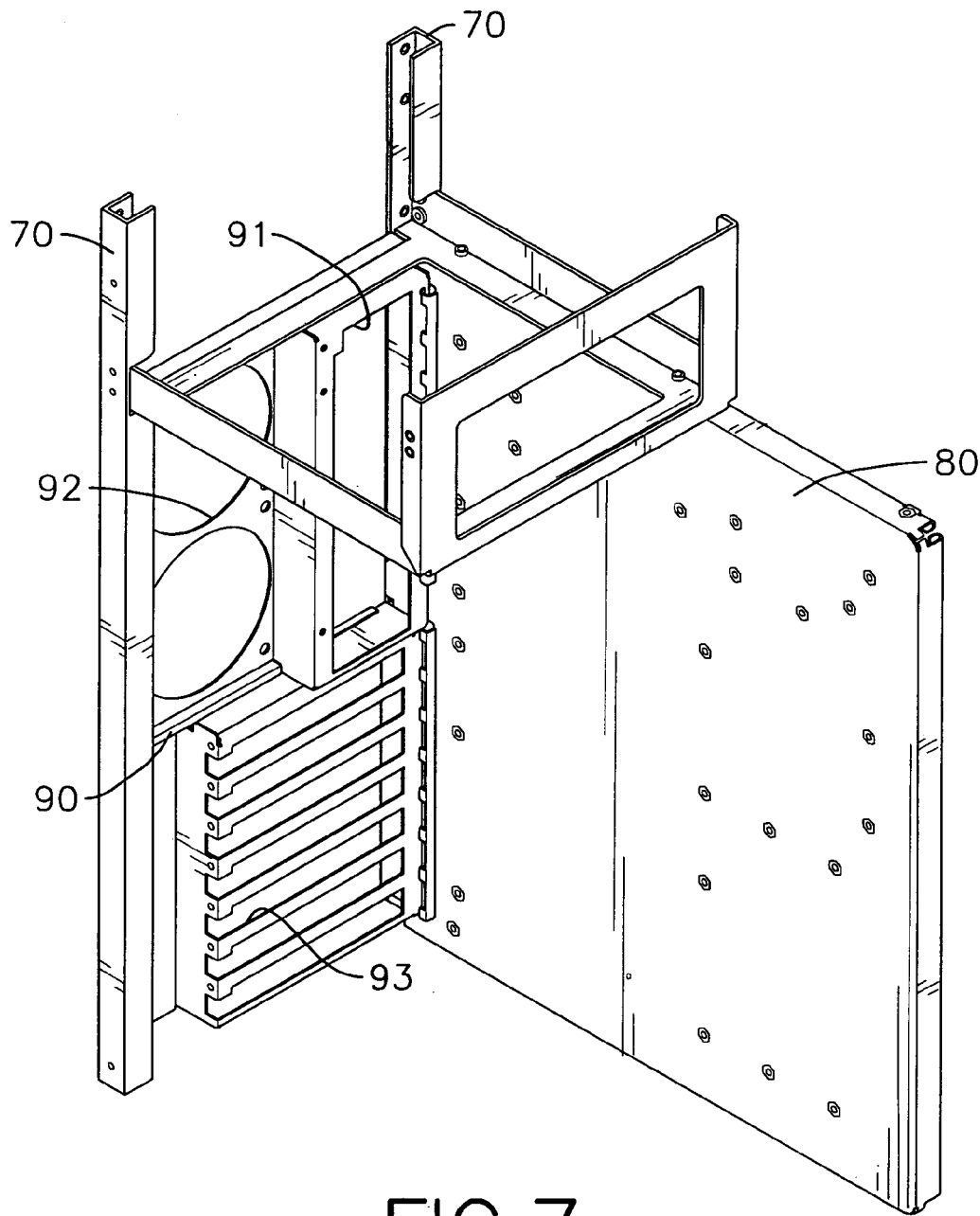
FIG. 7 is a perspective view of a conventional chassis in accordance with the prior art.

2. When the computer chassis in accordance with the present invention is adapted to the BTX motherboard:

With reference to FIGS. 4, 5 and 6, the motherboard holder (20) is mounted to the first post (11). The bent tab (21) of the motherboard holder (20) is mounted between the front side wall (122) and the back side wall (124) of the first post (11). The front side wall (112) of the first post (11) is engaged into the slot (211) of the motherboard (20). The guardian board (30) rotates in a horizontal direction and is mounted between the first post (11) and the second post (12) with the side tab (31) of second side (304) mounted to the back side wall (114) of the first post (11) and the side tab (31) of the first side (303) mounted to the back side wall (124) of the first post (12). The stop (321) of the bottom edge (302) of the guardian board (30) is adjacent to the bottom of the power supply holder (13).

The mounting board (40) rotates in a horizontal direction and is mounted between the first post (11) and the second post (12) with the side tab (41) of second side (404) mounted to the back side wall (114) of the first post (11) and the side tab (41) of first side (403) mounted to the back side wall (124) of the first post (12). The flange (431) of the bottom edge (402) of the mounting board (40) is engaged with the stop (321) of the top edge (301) of the guardian board (30).

The computer chassis in accordance with the present invention is compatible with ATX and BTX motherboards. Computer chassis manufacturers can manufacture and sell the computer chassis in accordance with the present invention for ATX and BTX motherboards. When ATX motherboards become obsolete, the computer chassis in accordance with the present invention is still marketable.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer chassis comprising:
   a post assembly having
      a first post having a top end and a bottom end;
      a second post opposite to the first post and having a top end and a bottom end; and
      a power supply holder mounted between the first post and the second post and having a bottom and two bottom sides;
   a motherboard holder detachably mounted to the first post, adjacent to the bottom of the power supply holder and having
      a top edge;
      a bottom edge;
      a proximal side connected to the first post;
      a mounting member defined on the proximal side and mounted to the first post; and
      a distal edge;
   a guardian board detachably mounted between the first post and the second post, connected to the bottom of the power supply holder and having
      a top edge;
      a bottom edge;
      a first side mounted to the second post;
      a second side mounted to the first post; and
      a rectangular hole defined through the guardian board close to the second side of the guardian board; and
   a mounting board detachably mounted between the first post and the second post, connected to the guardian board and having
      a top edge;
      a bottom edge;
      a first side mounted to one of the first post and the second post;
      a second side mounted to the other of the first post and the second post;
      multiple longitudinal slots defined through the mounting board, arranged abreast and perpendicular to the first post and the second post; and
      multiple mounting bores defined on the first side of the mounting board, corresponding to and adjacent respectively to the multiple longitudinal slots.

2. The computer chassis as claimed in claim 1, wherein the first post further comprises
   a first spine having two sides;
   a front side wall extending from one of the sides of the first spine and having a first mounting notch defined close to the top end of the first post;
   a back side wall extending from the other side of the first spine;
the second post further comprises
   a second spine having two sides;
   a front side wall extending from one of the sides of the second spine and having a second mounting notch defined close to the top end of the second post and aligned with the first mounting notch; and
   a back side wall extending from the other side of the second spine;
the power supply holder is engaged with the first mounting notch and the second mounting notch between the first post and the second post;
the mounting member of the motherboard holder is a bent tab extending from the proximal side of the motherboard holder and mounted between the front side wall and the back side wall of one of the first post and the second post; and
a vertical slot defined between the bent tab and the proximal side of the motherboard holder and holding the front side wall of one of the first post and the second post inside.

3. The computer chassis as claimed in claim 1, wherein the guardian board further comprises two side tabs defined respectively on the first side and the second side of the guardian board and mounted respectively to the first post and second post; and
the mounting board further comprises two side tabs defined respectively on the first side and the second side of the mounting board and mounted respectively to the first post and second post.

4. The computer chassis as claimed in claim 2, wherein the guardian board further comprises two side tabs defined respectively on the first side and the second side of the guardian board and mounted respectively to the back side wall of the first post and the back side wall of the second post; and
the mounting board further comprises two side tabs defined respectively on the first side and the second side of the mounting board and mounted respectively to the back side wall of the first post and the back side wall of the second post.

5. The computer chassis as claimed in claim 1, wherein the guardian board further comprises two stops defined respectively on the top edge and the bottom edge of the guardian board; and
the mounting board further comprises two flanges corresponding to the stops and defined respectively on the top edge and the bottom edge of the mounting board.

6. The computer chassis as claimed in claim 2, wherein the guardian board further comprises two stops defined respectively on the top edge and the bottom edge of the guardian board; and
the mounting board further comprises two flanges corresponding to the stops and defined respectively on the top edge and the bottom edge of the mounting board.

7. The computer chassis as claimed in claim 3, wherein the guardian board further comprises two stops defined respectively on the top edge and the bottom edge of the guardian board; and
the mounting board further comprises two flanges corresponding to the stops and defined respectively on the top edge and the bottom edge of the mounting board.

8. The computer chassis as claimed in claim 4, wherein the guardian board further comprises two stops defined respectively on the top edge and the bottom edge of the guardian board; and
the mounting board further comprises two flanges corresponding to the stops and defined respectively on the top edge and the bottom edge of the mounting board.

9. The computer chassis as claimed in claim 8, wherein the top edge of the motherboard holder further comprises two top mounting bores;

the bottom edge of the motherboard holder further comprises two bottom mounting bores; and each bottom side of the power supply holder further comprises two side mounting bores corresponding to the top mounting bores and the bottom mounting bores of the motherboard holder.

10. The computer chassis as claimed in claim 9, wherein the guardian board further comprises two vents defined through the guardian board close to the first side of the guardian board.

* * * * *